United States Patent
Park et al.

(10) Patent No.: US 8,611,276 B2
(45) Date of Patent: Dec. 17, 2013

(54) METHOD AND SYSTEM FOR PROVIDING MEDIA STORED IN A POC BOX IN A POC SYSTEM

(75) Inventors: Sung-Jin Park, Suwon-si (KR); Wuk Kim, Gwacheon-si (KR); Sang-Kyung Sung, Seoul (KR); Ji-Hye Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 581 days.

(21) Appl. No.: 11/529,715

(22) Filed: Sep. 26, 2006

(65) Prior Publication Data

US 2007/0232343 A1      Oct. 4, 2007

(30) Foreign Application Priority Data

Mar. 28, 2006  (KR) .................. 10-2006-0028146

(51) Int. Cl.
| | |
|---|---|
| H04M 11/10 | (2006.01) |
| H04M 3/42 | (2006.01) |
| H04M 1/64 | (2006.01) |
| H04M 11/00 | (2006.01) |
| H04B 7/00 | (2006.01) |
| H04N 7/173 | (2011.01) |
| G06F 15/16 | (2006.01) |

(52) U.S. Cl.
USPC ..... 370/328; 455/413; 455/414.2; 455/414.3; 455/518; 725/87; 725/99; 709/219; 379/67.1; 379/84; 379/88.13

(58) Field of Classification Search
USPC .................................. 455/518, 413
See application file for complete search history.

(56) References Cited

U.S. PATENT DOCUMENTS

| | | | |
|---|---|---|---|
| 2004/0131042 A1* | 7/2004 | Lillie et al. ..................... | 370/351 |
| 2004/0224710 A1* | 11/2004 | Koskelainen et al. ........ | 455/518 |
| 2006/0088065 A1* | 4/2006 | Khatter ......................... | 370/528 |

* cited by examiner

Primary Examiner — Rafael Pérez-Gutiérrez
Assistant Examiner — Joshua Schwartz
(74) Attorney, Agent, or Firm — The Farrell Law Firm, P.C

(57) ABSTRACT

A method and system for providing desired media when a Push-To-Talk (PTT) over Cellular (PoC) User Equipment (UE) retrieves media information stored in a PoC box and requests a desired media transmission in a PoC system. In the PoC system, the PoC UE sends, to the PoC box, a request for media information stored in the PoC box to receive media stored in the PoC box. When receiving the media information request, the PoC box sends the stored media information to the PoC UE. The PoC UE selects desired media using the received media information and requests a PoC box media transmission. The PoC box sends the requested media to the PoC UE.

14 Claims, 8 Drawing Sheets

| V=2 | P | 0 0 0 0 0 | PT=APP=204 | Length |
|---|---|---|---|---|
| SSRC of PoC Client requesting permission to send a Media burst ||||
| Name = PoC2 ||||
| Option ID | | Option Length | | |
| Option Value ||||
| Option ID | | Option Length | | |
| Option Value ||||

FIG.7A
(PRIOR ART)

| V=2 | P | 0 0 0 0 0 | PT=APP=204 | Length |
|---|---|---|---|---|
| SSRC of PoC Client requesting permission to send a Media burst ||||
| Name = PoC2 ||||
| Option ID = 3(PoC Box USE) || Option Length=4 | | |
| Option Value = 0 ~ 2^16<br>UNIQUE NO. OF MEDIA XML DOCUMENT ELEMENT STORED IN PoC BOX ||||

FIG.7B

| V=2 | P | 0 0 0 0 0 | PT=APP=204 | Length |

| SSRC of PoC Server performing Controlling PoC Function |

| Name = PoC2 |

| PoC Box = 102 | PoC Box Length=4 | |

| UNIQUE NO. OF MEDIA XML DOCUMENT ELEMENT STORED IN PoC BOX |

FIG.7C

METHOD AND SYSTEM FOR PROVIDING MEDIA STORED IN A POC BOX IN A POC SYSTEM

PRIORITY

This application claims priority under 35 U.S.C. §119 to an application filed in the Korean Intellectual Property Office on Mar. 28, 2006 and assigned Serial No. 2006-28146, the contents of which are incorporated herein by reference.

BACKGROUND OF THE INVENTION

1. Field of the Invention

The present invention generally relates to a method and system for managing a Push-To-Talk (PTT) over Cellular (PoC) box in a PoC system, and more particularly to a method and system for providing desired media when a PoC User Equipment (UE) retrieves media information stored in a PoC box and requests a desired media transmission in a PoC system.

2. Description of the Related Art

With the significant development of mobile communication and the extension of a communication network, variously extended services and applications using mobile phones are being provided. According to various user requests, service is being extended to a positioning service, multimedia service, Push-To-Talk (PTT) service, and so on beyond a simple call service. Specifically, the PTT service supports various additional functions, such as an instant messenger function, state display function, etc., as well as a group call and a voice call that are possible in a conventional radio system or a Trunked Radio System (TRS).

A concept of this PTT service is being actively discussed to standardize a PTT over Cellular (PoC) service using a mobile communication network. One of characteristics of the PoC service different from a conventional mobile communication service is that users can perform communication while moving between multiple sessions according to need. The requirement that users should be able to perform communication while moving between multiple sessions is prescribed in the PoC 1.0 standard of the Open Mobile Alliance (OMA) serving as an organization for developing a standard for a mobile communication service.

As defined in the PoC 1.0 standard, media data is sent only to PoC clients participating in a PoC session in real time. Because of this characteristic, users who do not participate in the PoC session for various reasons including, for example, battery discharge, absence, etc., cannot receive a media stream, such as voice or the like, in a one-to-one (1-1) or group PoC session. That is, the PoC 1.0 technology does not support a function of a voice mail box supported in a conventional communication.

To address a problem when a PoC User Equipment (UE) does not participate in a session and cannot receive a media stream, OMA PoC Release 2 considers a PoC box whose function is similar to that of a Multi Media (MM) box for a conventional Multi Media Service (MMS). A PoC box service is a service in which a PoC client incapable of participating in a 1-1 or group PoC session in real time participates in an associated PoC session using a particular physical or logical storage system. As described above, the PoC box stores media sent in a session when a PoC client participates in an associated PoC session. Subsequently, the stored media are sent and reproduced according to the PoC client's request.

When the PoC client participates in a PoC session and makes a request for receiving stored media from a PoC box storing media sent in the session, all stored media are provided from the PoC box to the PoC client. A user of the PoC UE receives undesired media, and also the right to select media desired by the user is limited.

SUMMARY OF THE INVENTION

Therefore, the present invention provides a method and system that can allow a user of a PoC UE to select desired media when media stored in a PoC box are provided.

Moreover, the present invention provides a method and system that can allow a user of a PoC UE to request a media transmission based on media information by sending in advance the media information stored in a PoC box to the PoC UE before media stored in the PoC box are provided.

In accordance with an aspect of the present invention, there is provided a method for providing media stored in a PoC box in a PoC system including a PoC UE, a PoC server, a proxy server with a function for routing to an XML XDMS, and the PoC box, the method including sending a media information request message from the PoC UE to the PoC server through the proxy server when a user requests media information stored in the PoC box; and sending the media information stored in the PoC box to the PoC UE when the PoC box receives the media information request message.

The method further includes sending, to the PoC server, a media transmission request message having a unique number mapped to selected media when the user selects particular media using the media information received by the PoC UE; delivering the media transmission request message to the PoC box when the PoC server receives the media transmission request message; and retrieving the unique number included in the received media transmission request message and sending stored media mapped to the retrieved unique number from the PoC box to the PoC UE.

In accordance with another aspect of the present invention, there is provided a system for providing media stored in a PoC box in a PoC system, the system including a PoC UE for sending a media information request message to the PoC box when a user requests media information stored in the PoC box; a routing server for routing the media information request message sent from the PoC UE to the PoC box; and the PoC box for sending stored media information to the PoC UE when receiving the media information request message.

The PoC UE sends, to a PoC server, a media transmission request message having a unique number mapped to selected media when the user selects particular media using the media information received by the PoC UE.

The system further includes the PoC server for delivering the media transmission request message to the PoC box when receiving the media transmission request message. The PoC box retrieves the unique number included in the received media transmission request message and sends stored media mapped to the retrieved unique number to the PoC UE.

BRIEF DESCRIPTION OF THE DRAWINGS

The above and other features and aspects of the present invention will be more clearly understood from the following detailed description taken in conjunction with the accompanying drawings, in which:

FIG. 7A illustrates an example of a conventional Media Burst Control Protocol (MBCP) request message;

FIG. 7B illustrates an example of an MBCP request message for sending a media transmission request from the PoC UE to the PoC server in FIG. 6; and FIG. 7C illustrates an example of an MBCP granted message for sending a media transmission request from the PoC server to the PoC box in FIG. 6.

DETAILED DESCRIPTION OF THE PREFERRED EMBODIMENTS

The present invention provides a method in which a user of a Push-To-Talk (PTT) over Cellular (PoC) User Equipment (UE) can receive in advance media information stored in a PoC box to receive media stored in the PoC box in an Open Mobile Alliance (OMA) PoC system, and can request a PoC box media transmission based on the media information so the requested media can be provided from the PoC box to the PoC UE.

First, a conventional PoC system to which the present invention can be applied will be described.

Figure 1:
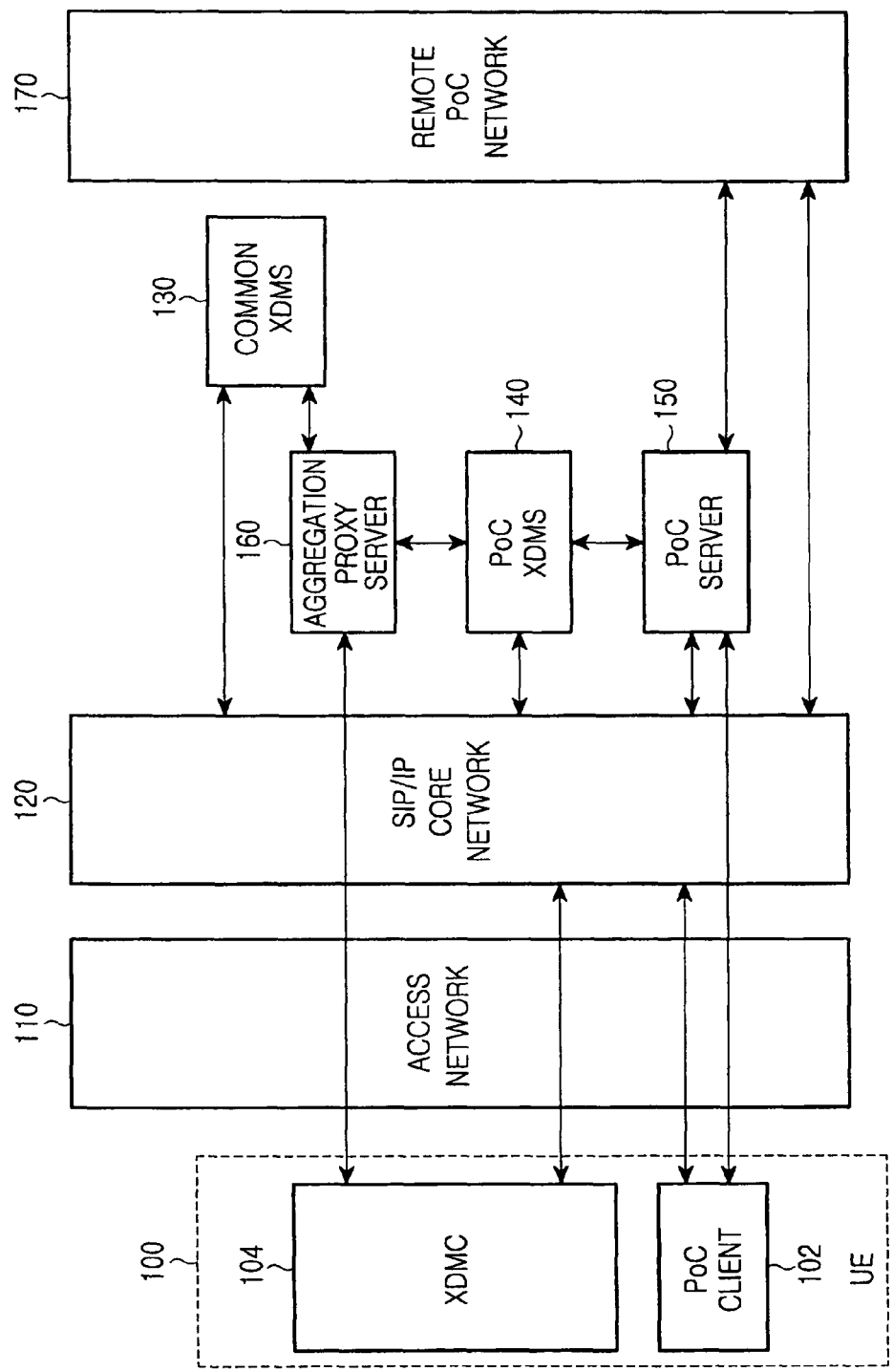
FIG. 1 illustrates a structure of a conventional PoC service system.

FIG. 1 shows a conventional PoC service system and an associated network structure. The conventional PoC system can be configured with a PoC UE 100, Extensible Markup Language (XML) Document Management Servers (XDMSs) 130 and 140, and a PoC server 150. The PoC system can further include an aggregation proxy server 160. These components can be connected through an access network 110, a Session Initiation Protocol/Internet Protocol (SIP/IP) core network 120, and a remote PoC network 170.

The PoC UE 100 can include a PoC client 102 and an XML Document Management Client (XDMC) 104.

The PoC client 102 is a service requester embedded in the PoC UE 100 and accesses a network for providing a PoC service to a PoC service subscriber while residing in the PoC UE 100. The PoC service subscriber can receive the PoC service through the PoC UE in which the PoC client is embedded. The term "PoC client" may be used as a general term for the UE in which the PoC client is embedded and the PoC service subscriber. A reference numeral denoting the PoC client will be omitted, except for when it should be specially distinguished.

The PoC client has a main function for establishing a PoC session for the PoC service subscriber, i.e., the PoC client, participating in a pre-established session, or ending an established session. Also, the PoC client performs a function for creating and transferring a talk burst, a function for supporting instant personal alert, an authentication function at the time of a connection to the PoC server, and so on. The PoC client can be connected to the SIP/IP core network 120 serving as the core network for supporting SIP/IP multimedia through the access network 110.

The SIP/IP core network 120 is connected to the PoC server 150, the XDMSs 130 and 140, and so on to support the PoC service. The PoC server 150 can perform a controlling PoC function for maintaining and managing the PoC session or a participating PoC function for participating in the PoC session opened for one-to-one or multiparty communication.

On the other hand, PoC service can be accompanied with a service for opening a group session as in a conference call. For this, the OMA standard defines the XDMC 104 and the XDMSs 130 and 140 for a group list service. As illustrated in FIG. 1, there are the PoC XDMS 140 used for PoC service and the XDMS 130 commonly available for other service enablers. Information about a group or group members can be stored in the XDMSs 130 and 140 through the PoC client 102. The PoC client 102 can know information of PoC clients capable of being called thereby through an individual or group list sent from the XDMSs 130 and 140. On the other hand, group and group member information stored in the XDMSs 130 and 140 can be generated, corrected, and managed through communication networks such as the Internet and Intranet capable of being relied upon by a PoC service provider. Because an XML-document management protocol for generating, correcting, and deleting a group list and its concrete contents are not directly related to the present invention, their detailed description is omitted.

In the PoC system configured as described above, a PoC user can input, correct, and delete information about a group and group members in the PoC XDMS through the XDMC implemented in its own UE and can know information about PoC users capable of being called thereby through the individual or group list received from the PoC XDMS. In another method capable of generating, correcting, and managing a group and group members in the PoC XDMS, information can be input through the XDMC implemented in communication networks such as the Internet and an Intranet capable of being relied upon by the PoC service provider.

For a group service, the aggregation proxy server 160 collects requests of all entities using an XML Configuration Access Protocol (XCAP) in the PoC system and transfers a collected request to an associated entity. That is, when a group list-related request is received from the XDMC 104, the received request is routed to the XDMSs 130 and 140 according to proper rule.

The PoC client registers its own PoC address in the SIP/IP so the aggregation proxy server 160 uses a PoC call service. The SIP/IP core network 120 stores information about the PoC client based on a request of the PoC client.

Next, the PoC server 150 will be described.

Figure 2:
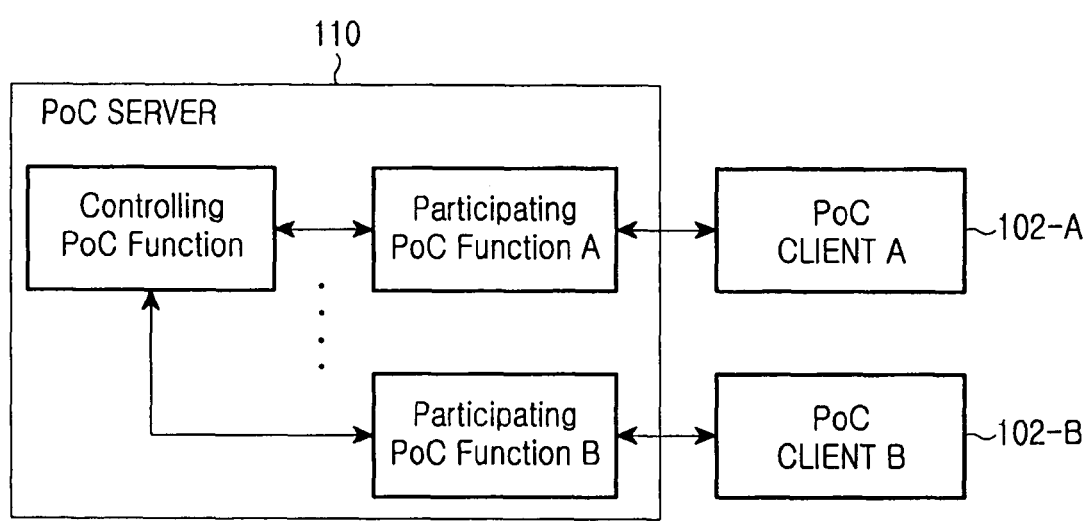
FIG. 2 illustrates a functional block structure of a conventional PoC server.

FIG. 2 shows a conventional PoC server. Functions of the PoC server are divided into a controlling PoC function (CF) for maintaining and managing the overall PoC session and a participating PoC function (PF) responsible for maintenance and management between sessions. Function-by-function characteristics of the PoC server will be described with reference to Table 1 and Table 2, shown below.

TABLE 1

| Controlling PoC Function (CF) Provides centralized PoC session handling |
| --- |
| Provides the centralized Media distribution |
| Provides the centralized Talk Burst Arbitration functionality including talker identification |
| Provides SIP session handling, such as SIP session origination, termination, etc |
| Provides policy enforcement for participation in group sessions |
| Provides the participants information |
| Collects and provides centralized media quality information |
| Provides centralized charging reports |
| May Provide transcoding between different codecs |
| Support Talk Burst Control Protocol Negotiation |

As shown in Table 1, the CF performs, among functions of the PoC server, a function that serves to manage the PoC sessions on the whole, particularly to receive, sequence and authorize the right-to-speak (or floor) requests of the PoC clients, to distribute a talk burst requested by an arbitrary PoC client to all the other PoC clients participating in group calling, and to provide information of the PoC clients participating in the group calling.

As shown below in Table 2, the PF serves to manage the sessions that are linked with the CF and the respective PoC clients in the PoC session. In particular, the PF serves to relay the right-to-speak when the PoC client requests the right-to-speak or when the right-to-speak is assigned to the PoC client in the CF. Moreover, the PF serves to relay media between the CF and the PoC client, to perform transcoding when different coder/decoders (codecs) are used between the CF and the PoC client, and to filter any one of two simultaneous sessions in response to the PoC client's selection when the PoC client participates in one session while participating in the other session.

TABLE 2

Participating PoC Function (PF) Provides PoC session handling

Figure 3:
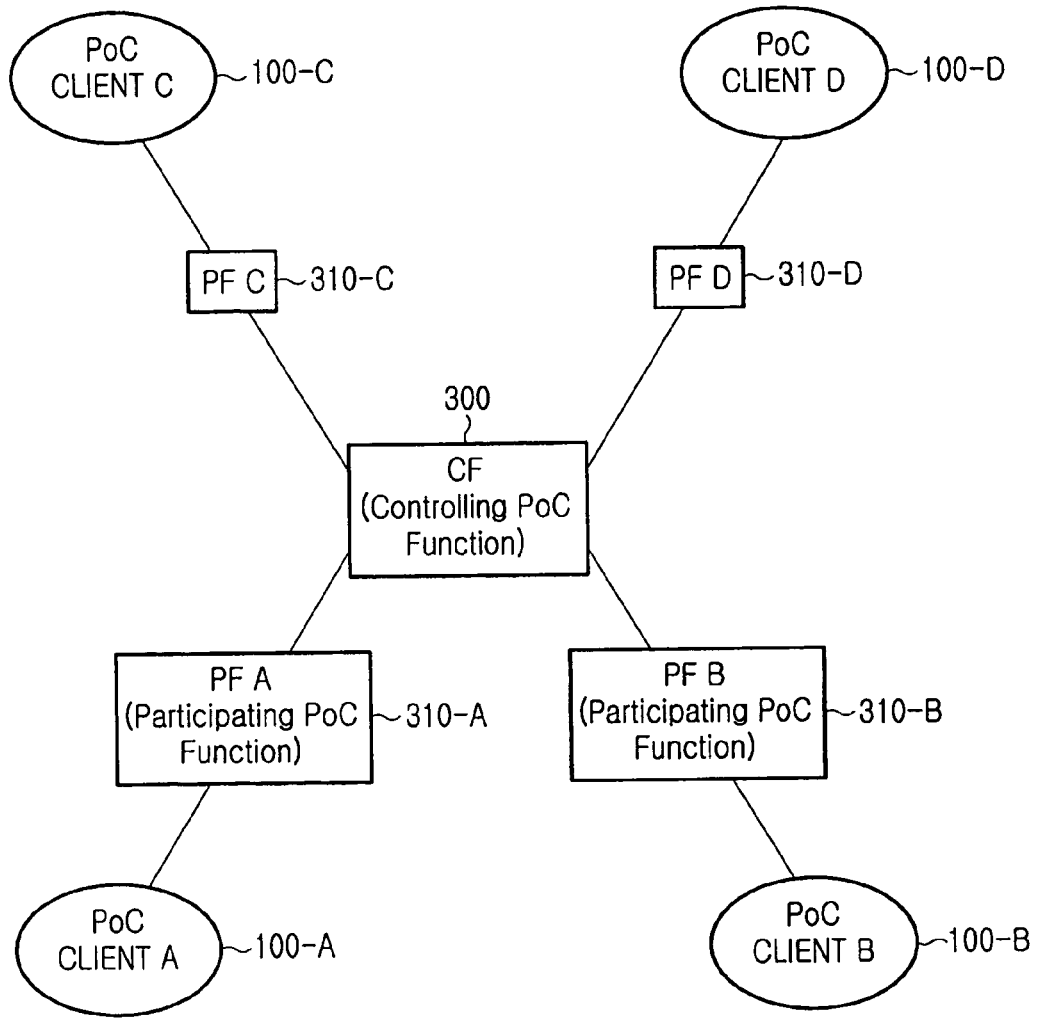
FIG. 3 illustrates a controlling PoC function block and a participating PoC function block of the PoC server.

May provide the Media relay function between PoC Client and Controlling PoC server
May provide user media adaptation procedures
May provide the Talk Burst control message relay function PoC Client and Controlling PoC server
Provides SIP session handling, such as SIP session origination, termination, etc, on behalf of the represented PoC Client
Provides policy enforcement for incoming PoC session (e.g., access control, incoming
PoC session barring, availability status, etc)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client FIG. 3 shows a controlling PoC function block and a participating PoC function block of the PoC server.

PoC clients 100-A to 100-D access a CF 300 through PFs 310-A to 310-D to set up a PoC session. For the speech of PoC clients having the floor assigned by the CF 300, media are provided to the respective PoC clients. The PoC client having the floor can make proper speech after identifying information of the PoC clients participating in a group session.

On the other hand, call processing technology for a call connection in the PoC system can perform various procedures according to requests and situations of transmitting and receiving sides. Characteristics of the PoC system for the OMA according to settings of the transmitting and receiving sides include the following.

The receiving side can set its own answer mode according to the PoC client's request. The answer mode can be divided into an automatic answer mode and a manual answer mode. In an automatic answer mode, a receiver immediately sends the answer from an associated network to the transmitting side instead of the manual answer when an associated PoC client is included in a PoC client list designated by the receiving side. The network can automatically send the answer in place of the UE because the PoC server has a function for performing the answer mode and storing an associated user list according to an answer-mode setting request of the UE. On the other hand, a manual answer mode operates where an associated user is unclear or is not included in a user list relative to the automatic answer mode, or where the receiver sets a manual answer mode for all users. A PoC call request is sent to the user's UE through a receiving network and a call connection is established by permission of the PoC client.

The PoC system classifies session modes into on-demand session mode and pre-established session mode according to connection setup with a PoC server within a home network of a user. The pre-established session mode is technology for pre-establishing a session between a PoC client and the PoC server belonging to the home network thereof in response to the PoC client's request. This pre-established session is necessary to quickly open a session when the PoC client pre-negotiates media parameters to be later used with the PoC server without re-negotiating the media parameters with the PoC server.

For the pre-established session, the PoC client provides supportable media parameters to a body, i.e., a Session Description Protocol Multipurpose Internet Mail Extensions (SDP MIME) body, in an SIP INVITE method, provides media parameters received from the server, and responds to the media parameters received from the server. A response message from the server includes identification information of a newly pre-established session and a conference Uniform Resource Identifier (URI) and is returned to the PoC client.

When the above-described pre-established session is used, pre-negotiation can be performed for an IP address, a port number, a codec to be used, a talk burst control protocol, and so on. The on-demand session mode indicates a state in which PoC clients do not set up a pre-established session. In the on-demand session mode, a PoC call connection procedure is performed after receiving an INVITE message from a PoC client.

The answer mode set for a call request in the PoC system can be stored in both the PoC server serving as the network element and the PoC client serving as the user's UE.

When the answer mode is set in the home network for managing the PoC client, it is implemented in the PoC server for performing the PF within the home network to which the PoC client belongs.

When the answer mode is set in the network, the PF immediately and automatically sends a response of a session progress message to a call request network when a PoC call request is received from a different PoC server. Thus, if the automatic answer mode is set, it has a simpler call request procedure in comparison with the case where a response is made after a session setup message is transferred to the PoC client. Thus, an initial floor assignment time is reduced.

Because a result different from a user's response intention can occur according to a situation when the automatic answer is made in the network, the answer mode can be set also in the PoC client. A priority of the answer mode of the PoC client is higher than that of the answer mode set in the network. This is to address a privacy problem when the answer mode is not reflected in real time due to a signal delay or error in the network if the PoC client changes its own answer mode and sends an answer mode update request to the PoC server.

The PoC service can set the answer mode of the user in both the PoC server and client. The answer mode is decided by the PoC client considering the most recent intention of the user. According to this decision, a media stream (of actual voice or video of the user) can be transferred.

A PoC multimedia session opening procedure in the PoC system with the above-described characteristics will be described.

The PoC client at the transmitting side sends a multimedia INVITE message using the SIP and makes a request for processing a call. In response to the request for processing a call, the PoC client at the receiving side takes various response procedures according to a pre-established session and answer mode setting in an associated PoC server. A call processing procedure for a PoC call will be described using a procedure where PoC clients at the transmitting and receiving sides are located in the same network.

The PoC client at the transmitting side sends, to an associated SIP/IP core network, an SIP INVITE request including SIP address information of the PoC client at the receiving side. The SIP INVITE message can further include elements of PoC address information of the PoC client at the transmitting side, a requested media parameter, and characteristic value information indicating the PoC service. The "requested media parameter" can include a plurality of characteristic values indicative of an audio and video encoding method, rate, payload type, etc., when a requested session is a multimedia session.

The SIP INVITE message is transferred to a participating PoC server through an IP Multimedia Subsystem (IMS) server within an IMS network, i.e., a P-CSPF and S-CSPF, using a path query in a Dynamic Host Configuration Protocol (DHCP) server or Domain Name Server (DNS). When a general call request is made, the participating PoC server connected to the PoC client can be implemented which is separated from the controlling PoC server for managing a talk burst of an opened session. The SIP INVITE request sent to the PF entity is transferred to the CF entity of the controlling PoC server through the associated SIP/IP core network.

On the other hand, a PoC session control network with the CF receives a response message from a network at the receiving side after transferring an SIP INVITE request message to the network at the receiving side. The SIP response message from the network at the receiving side can be a provisional response message of 1xx, a successful response message of 2xx, or an error response message of 4xx~6xx according to setting of the PF and the PoC client at the receiving side. In the case of the automatic answer mode, an SIP 183 "session progress" signal can be received as a response message. Through this message, a connection between the PoC server and client can be established in the IMS network of a call requester. A call acknowledgment signal of the PoC client at the receiving side is returned as a SIP 183 "session progress" signal or an SIP 200 "OK" response, and is transferred to the PoC client through the PoC server of the CF and PF. When receiving the SIP 200 "OK" response or the SIP 183 "session progress" signal from the PoC server at the receiving side, the CF entity determines that a PoC call has been connected and sends a floor granted signal for assigning the floor for a talk burst to the PoC client at the transmitting side. The response of the SIP 200 "OK" or 183 "session progress" signal can be classified as a "confirmed" or "unconfirmed" response. The CF entity requires a buffering function when the "unconfirmed" response is received.

On the other hand, the PoC client at the transmitting side receives a talk burst transmission granted signal, for example, a floor granted signal for transferring call connection sound, through a Real Time Control Protocol (RTCP) after receiving the response signal to the SIP INVITE request signal. The floor granted signal is generated from the CF entity having the right to arbitrate a talk burst and is sent to the PoC client through the PF entity for managing an associated PoC client. Because the floor granted signal uses a bearer path without use of the SIP, it can be sent without passing through the SIP/IP core network such as the IMS. When identifying the call connection sound, the PoC client sends media, for example, a voice stream, using a Real-time Transport Protocol (RTP).

When another PoC client attempts a PoC group call in the PoC system configured as described above, its own information is first registered in the SIP/IP network and a call request is sent to the SIP/IP core network 120 using group identification information received from the PoC XDMS 140. The SIP/IP core network 120 transfers a PoC call request to a home PoC server in which the PoC client making the request is registered after performing an address decision process and a domain position decision process using information of the PoC client making the request. The PoC server 150 prepares to open a PoC session in response to the PoC call request, and transfers the call request signal to an associated SIP/IP core network after acquiring user information from the PoC XDMS 140. In the case of the call request for users within an intra-domain, the PoC server performs both the PF and CF. The PoC server for managing a PoC client for receiving the call request sends the call request to the associated PoC client after performing a position decision process of the SIP/IP core network using its own received PoC client information. The PoC call is opened if the PoC client sends an "OK" response to the PoC client making the call request when receiving the PoC call request. When a PoC client requests a PoC call but the PoC call is opened according to situation of an opposite PoC client, voice or media to be sent can be stored using a PoC box.

When the PoC client sends a Media Burst Control Protocol (MBCP) request message serving as a media transmission request message to the PoC server to send media, the PoC server receives the message and determines whether a media transmission is limited. Then, an MBCP granted message serving as a message for permitting the media transmission is sent to the PoC client. Only the PoC client receiving the MBCP granted message has the floor.

The media transmission request message will be described with reference to FIG. 7A. The first 2-bit field indicates an RTP version. In the present invention, an example of the RTP version (=2) is illustrated. The next bit field may contain a padding bit. If the padding bit is given, it can be seen that one or two padding octets are added which do not belong to a payload. The next 5-bit field indicates a sub-type. Referring to the OMA PoC user-plane specification, a function of an RTCP app packet in a Talk Burst Control protocol (TBCP) can be found using the sub-type field. For example, in the current OMA spec, a sub-type value is defined as 00000 in the case of the MBCP talk burst request and is defined as 00001 in the case of the MBCP talk burst granted message. Because 16 TBCP talk burst control messages are defined up to now, the sub-type value up to 01111 can be defined. The remaining 16 values are reserved for TBCP talk burst control messages to be newly generated later. The next 1-byte filed indicates a value of 204 indicating a packet type, and indicates that the message is an RTCP app packet. If the next 2-byte length field has a value of 2, it means that the message has two 4-byte octets. When the payload is attached, this field indicates the total number and length of 4-byte octets. The next 4 bytes are a synchronization field. This field includes a synchronization source associated with a sender of the RTCP app message. The next 4-byte field is expressed in the American Standard Code for Information Interchange (ASCII), and is used to identify a PoC version in the OMA PoC spec.

The next option ID-related filed indicates a priority if an option ID value is 1 at the time of a media transmission for the PoC user, and indicates an MBCP request transmission time stamp if the option ID value is 2.

The present invention proposes a method for including information about media desired by a PoC client among a plurality of media stored in the PoC box in a conventional MBCP message as illustrated in FIG. 7A and providing the desired media to a PoC user. Next, MBCP request and granted messages in accordance with the present invention will be described in detail.

A system structure for receiving a desired media transmission request based on media information stored in a PoC box from a PoC UE and providing desired media in the PoC system will be described with reference to FIG. 4.

The PoC system in accordance with the present invention includes a PoC UE 100, a PoC server 150, a network PoC box 407 serving as a media memory, and an aggregation proxy server 160. The network PoC box 407 is referred to as the PoC box 407. In accordance with the present invention, an example of the network PoC box has been described. Of course, the proposed method can be applied also for a UE PoC box.

The PoC UE 100 can be configured with a PoC client 102, an XDMC 104, a user interface 401, and a data transmitter 404.

The PoC client 102 performs a function for opening a PoC session to receive media stored in the PoC box 407 and a function for generating and sending an MBCP request message serving as a message for requesting the media stored in the PoC box 407. The PoC client 102 can open a PoC session with the PoC box 407 through the PoC server 150 or can directly open the PoC session with the PoC box 407 without passing through the PoC server 150.

When the PoC client 102 opens the PoC session through the PoC server 150, two types of messages for sending a media transmission request to the PoC box 407 can be generated. A floor request message for the PoC box 407 is the MBCP request message. After receiving the message, the PoC server 150 sends an MBCP granted message for assigning the floor, to the PoC box 407 rather than the PoC client 102. The floor request message is generated which includes only information for requesting a transmission of media of the PoC box 407. The PoC server 150 performs a function for only sending the message to the PoC box 407. In the two cases, the media request message should include position information of media stored in the PoC box 407. The MBCP request message serving as the PoC box media transmission request message will be described in detail.

An XDMC 104 is an XCAP client for providing a function for performing management for generating, correcting, and deleting an XML document stored in the PoC XDMS or the PoC box 407. This XDMC 104 can be registered so notification can be received when an XML document stored in the PoC box 407 is changed. If the XDMC 104 is registered so notification can be received when an XML document stored in the PoC box 407 is varied, another PoC client can immediately know when media are stored in a PoC box set thereby. In accordance with the present invention, the case where the XDMC 104 of the PoC UE 100 can detect information about media stored in the PoC box 407 by retrieving an XML document stored in the PoC box 407 in response to the user's request will be described. The media information is, for example, information about a media type, a provider PoC client, a reception time, a stored media position, and so on.

A user interface 401 transfers the user's input to the PoC UE 100. The data transmitter 404 transmits and receives packet data. The data transmitter 404 can include transport protocol stacks for transmitting and receiving packet data. The data transmitter 404 can include RTP/RTCP/Hyper Text Transfer Protocol (HTTP), User Datagram Protocol (UDP), IP and lower layer stacks.

Next, the PoC server 150 will be described. When receiving a message for requesting a transmission of media of the PoC box 407, the PoC server 150 determines whether the received message is a floor request message for the PoC box 407. If the received message is the floor request message for the PoC box 407, the PoC server 150 generates an MBCP granted message and sends the generated message to the PoC box 407 rather than the PoC client 102. The MBCP granted message should include media position information of the PoC box 407. However, if the received message is not the floor request message for the PoC box 407, the PoC server 150 sends the received message to the PoC box 407. Similarly, the message should include media position information of the PoC box 407.

Next, the aggregation proxy server 160 will be described. When receiving a message for requesting information about media stored in the PoC server 407 from the XDMC 104, the aggregation proxy server 160 transfers the received message to the PoC box 407 and transfers media information of the PoC box 407 constructed by an XML document to the XDMC 104.

Figure 5:
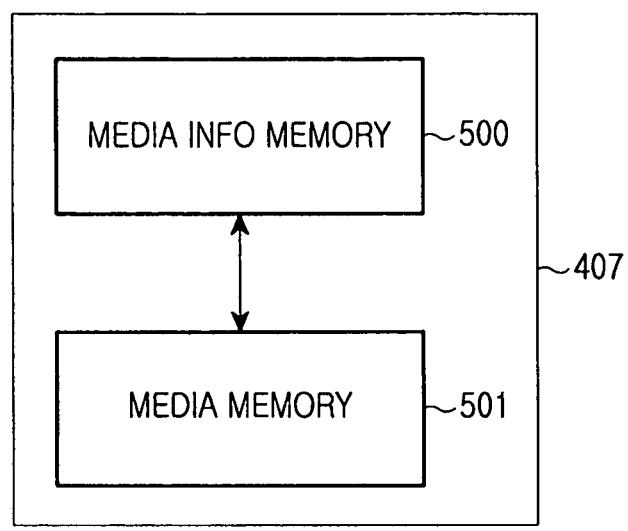
FIG. 5 illustrates an internal structure of the PoC box in accordance with the present invention.

Next, the PoC box 407 will be described with reference to FIG. 5. In accordance with the present invention, the PoC box 407 is configured with a media memory 501 and a media information memory 500 for storing information about media stored therein.

The media information memory 500 stores an XML document containing the information about the media stored in the PoC box 407. The information stored in the XML document is different between a group PoC session and a one-to-one PoC session. In the case of the group PoC session, the information about the stored media is contained in the XML document including a group conference ID, information about a PoC client or user starting the group PoC session, a session participant list, media information, start and end times of a group call, time information such as a period of time in which the stored media can be kept, and an address at which actual media are stored. In the case of the one-to-one PoC session, the XML document contains information about a PoC client starting a one-to-one session, media information, a time at which media have been stored, a period of time in which the stored media can be kept, and an address at which actual media are stored.

In the present invention, the media information can be separately stored in the PoC box 407 and can be provided when the user of the PoC UE requests the information about the media stored in the PoC box 407. An address at which the actual media are stored is stored in each element of the XML document. Each element has a unique number. The unique number of the XML document element mapped to the associated media is stored. Thus, when the user requests or deletes particular media, a binary address is not used, but a text-based address capable of being recognized by the user can be used. Instead of a complex binary address system, the unique number of the XML document element can be used in the MBCP request message or the MBCP granted message. Thus, there is an advantage in that the actual media can be managed using the XML document elements.

On the other hand, when received media are stored in the media memory 501, the media information memory 500 stores and manages information about the received media and a unique number that are mapped to each other.

In the present invention, there has been described one example in which a unique number of an XML document element is included in the MBCP request message or the MBCP granted message. Alternatively, an actual address of media stored in the PoC box may be included in the MBCP request message or the MBCP granted message.

Figure 4:
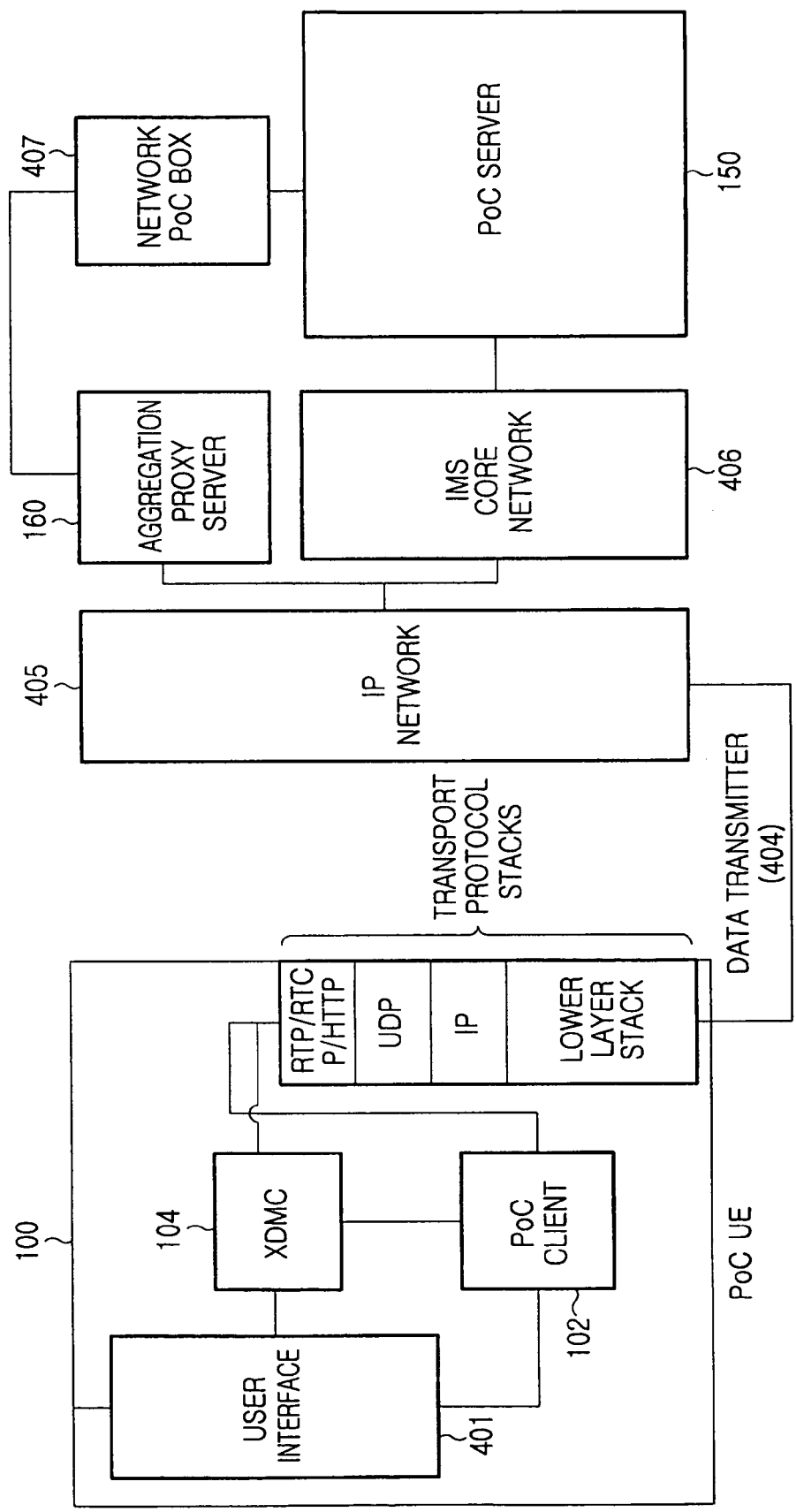
FIG. 4 is a block diagram illustrating a PoC system including a PoC UE and a PoC box in accordance with the present invention.
Figure 6:
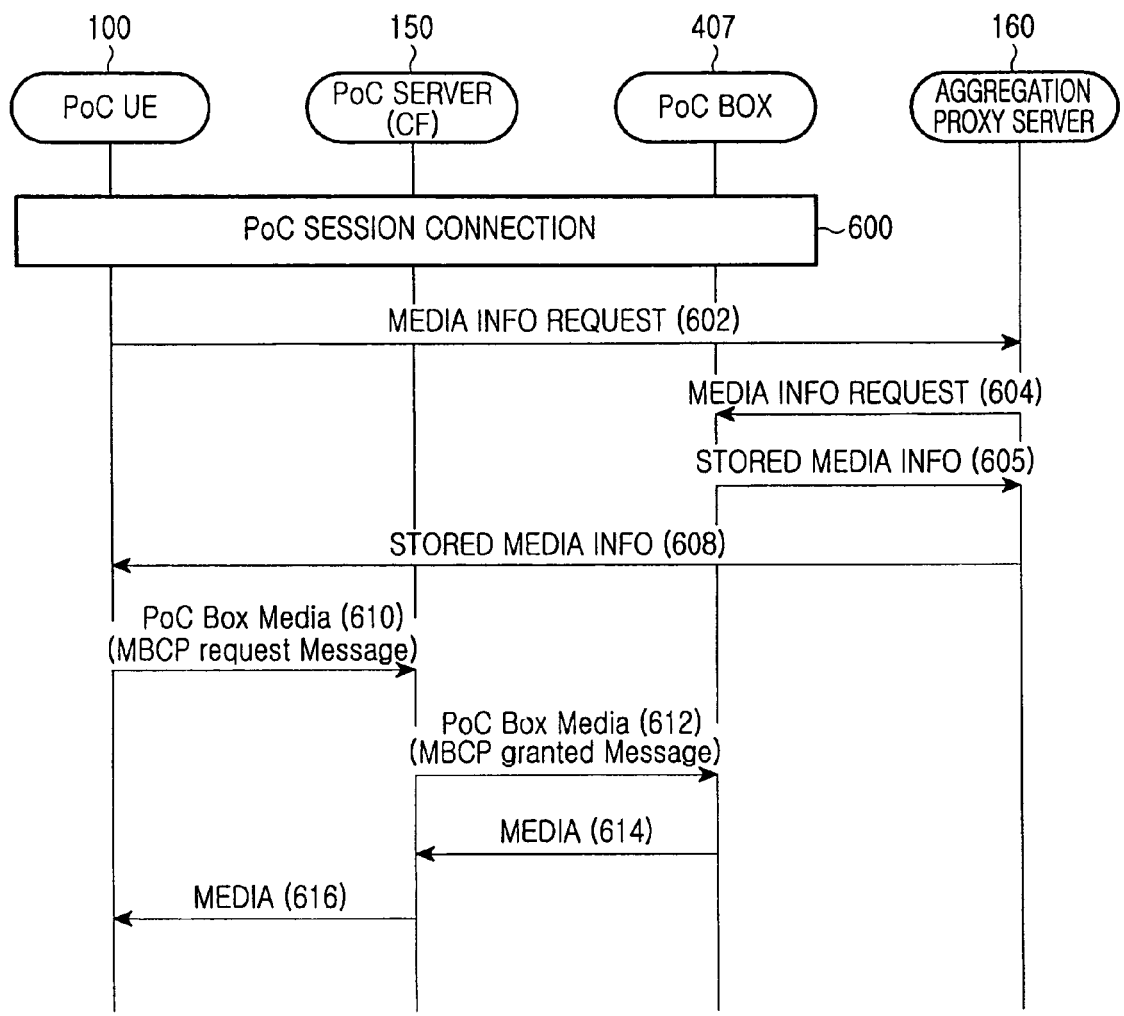
FIG. 6 is a signal flow diagram illustrating a process for providing media stored in the PoC box using a PoC session in accordance with the present invention.

An operation between the components when the PoC UE 100 requests and receives information about media stored in the PoC box 407 and receives necessary media after retrieving in advance the media information in the PoC system configured as illustrated in FIG. 4 will be described with reference to FIG. 6. First, it is assumed that a PoC session between the PoC UE 100 and the PoC box 407 is connected in step 600.

When the user inputs a media information request, the XDMC 104 of the PoC UE 100 sends a message for requesting media information stored in the PoC box 407 to the aggregation proxy server 160 in step 602. This request message is sent to the aggregation proxy server 160 through an XDM-3 interface. A used protocol is the XCAP.

When receiving the media information request message, the aggregation proxy server 160 checks an address of requested information contained in the media information request message and sends the request message to the PoC box 407 through a PoC-x interface in step 604.

When the message for requesting the media information stored in the PoC box 407 is received, an XML document containing the media information stored in the media information memory 500 is sent to the XDMC 104 of the PoC UE 100 through the aggregation proxy server 160 in steps 605 and 608.

Three methods are used to send the media information stored in the media information memory 500 of the PoC box 407. In one method, the PoC UE 100 directly requests the media information stored in the PoC box 407 and receives the media information from the PoC box 407. In another method, the PoC box 407 periodically sends the stored media information to the PoC UE 100. In another method, the stored media information is sent to the PoC UE 100 when the media information stored in the PoC box 407, i.e., the XML document, has been changed, for example, when new media have been stored, an information storage time has expired, or deletion has occurred. In the present invention, an example in which the PoC UE 100 directly requests the stored media information and receives the media information from the PoC box 407 as illustrated in FIG. 6 will be described.

When receiving media information from the PoC box 407, the PoC UE 100 displays the received media information to the user through a screen. The media information received by the PoC UE 100 includes a unique number of an XML document element of each of the media. The user of the PoC UE 100 can select desired media to be received using the displayed media information.

Then, the PoC client 102 generates a media transmission request message containing an option ID value for requesting the stored media using the media information stored in the PoC box 407. The media transmission request message can use the MBCP request message. This message contains the option ID value indicating the use of the PoC box 407 and a unique number of an XML document element mapped to the media selected by the user.

The PoC client 102 sends the generated PoC box media transmission request message to the PoC server 150 in step 610.

When receiving the PoC box media transmission request message, the PoC server 150 checks the option ID value contained in the received message and determines that the received message is a message for requesting the media stored in the PoC box 407. In step 612, the PoC box media transmission request message is sent to the PoC box 407. The sent PoC box media transmission request message is the MBCP granted message. Because the PoC server 150 has determined that the received request message is the message for requesting a transmission of media stored in the PoC box 407, it sends the MBCP granted message to the PoC box 407 rather than the PoC client 102. The MBCP granted message contains a unique number of an XML document element like the MBCP request message. When determining that the MBCP request message is the PoC box media transmission request using the option ID, the PoC server 150 can send the MBCP request message to the PoC box 407.

When receiving the MBCP granted message or the MBCP request message, the PoC box 407 retrieves the unique number of the XML document element contained in the message and retrieves address information of media requested by the PoC client 102. Subsequently, the PoC box 407 reads the media stored at the retrieved address from the media memory 501 and sends the read media to the PoC client 102 through the PoC server 150 in steps 614 and 616.

In the present invention, the PoC user can retrieve in advance media information stored in the PoC box and can receive desired media.

A format of the MBCP request message corresponding to the PoC box media transmission request message sent from the PoC client to the PoC server in step 610 of FIG. 6 will be described with reference to FIG. 7B.

Referring to FIG. 7B, the MBCP message contains a value indicating a PoC box media transmission request message in an option ID. For example, if it assumed that the MBCP message is the PoC box media transmission request message when the option ID value is 3, the PoC client includes and transmits the value of 3 in the option ID field to send the PoC box media transmission request to the PoC server. In an example of FIG. 7B, a value of an option length field is 4. The option length value indicates a sum of bytes of option-related fields. Thus, the option value can be a 2-byte value. An actual value can have a range of 0~(2^16−1). The option value is connected to a unique number of an element of each XML document. For example, when the option value is 1, media information in which an element of the stored XML document mapped to 1 is stored is referred to and media stored in the associated position are sent to the PoC client. In another example, a number or character can be expressed in the option value field, or an address at which actual media are stored can be included in the option value field. In this case, the value of the option length field can increase according to the option value.

As described above, the PoC server can identify the PoC box media request message using the option ID. In another embodiment, a new MBCP message can be generated to request PoC box media without use of an MBCP request message. A new subtype number is inserted into the MBCP message. Using the subtype number, the PoC server can determine that this MBCP message is a PoC box media request message. The subtype number has 5 bits between "P" and "PT=APP=204" fields, thereby indicating 32 messages. For example, the subtype number of 00000 indicates an MBCP request message, the subtype number of 00001 indicates an MBCP granted message, and the subtype number of 00010 indicates an MBCP taken message. The remaining length, Synchronization Source (SSRC) and name fields are the same as those of the prior art.

A format of the MBCP request message corresponding to the PoC box media transmission request message sent from the PoC client to the PoC server in step 612 of FIG. 6 will be described with reference to FIG. 7C. Conventionally, when the PoC server receives the MBCP request message, it sends an MBCP granted message for permitting a media transmission to the PoC client. However, in the present invention, this MBCP granted message is sent to the PoC box rather than the PoC client requesting a media transmission, so the PoC box sends media.

Referring to FIG. 7C, the MBCP granted message contains PoC box media transmission request information like the MBCP request message. A value of a PoC box field is used to identify use of the PoC box. In FIG. 7C, the PoC box field value set to 102 indicates the use of the PoC box. The length field is the same as that of the above-described MBCP request message. A PoC box media list number is mapped to a unique number of each XML document element. Actual media information including the mapped XML document element is referred to and media stored in the associated position are sent to the PoC client.

In the PoC system, the PoC UE sends, to the PoC box, a request for media information stored in the PoC box to receive media stored in the PoC box and the PoC box sends the stored media information to the PoC UE when receiving the media information request. Then, the PoC UE selects desired media using the received media information and requests a PoC box media transmission. The PoC box sends the requested media to the PoC UE.

In the present invention, media information stored in the PoC box is sent in advance to the PoC UE before media stored in the PoC box are provided. When the media stored in the PoC box are provided, the user of the PoC UE selects desired media to be received, thereby requesting a media transmission based on the media information. There is an advantage in that the user of the PoC UE can have the right to select desired media without receiving all media stored in the PoC box as in the conventional method.

The PoC client can easily manage an XML document containing media information stored in the PoC box using the XCAP through the XDM-3 and PoC-x interfaces. When a PoC session is used, media stored in the PoC box can be sent to the PoC client without using a new protocol, for example, a Real Time Streaming Protocol (RTSP), so an improvement can be accomplished using an existing floor control message.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for managing media in a Push-To-Talk (PTT) over Cellular (PoC) box in an aggregation proxy server for sending media to a PoC User Equipment (UE) in a PoC system comprising the PoC UE, the aggregation proxy server with a function for routing to an Extensible Markup Language (XML) Document Management Server (XDMS), and the PoC box, the method comprising the steps of:

receiving, by the aggregation proxy server, a PoC session control data request message which is associated with media information stored in the PoC box from the PoC UE;

sending the PoC session control data request message for requesting the media information stored in the PoC box to the PoC box; and receiving the media information in an XML form from the PoC box in response to the PoC session control data request message, and sending the media information received from the PoC box, wherein the media information differs from the media stored in the PoC box, wherein the media information includes a stored position of the media stored in the PoC box and at least one of a media type, a provider PoC client, and a reception time, and the media information is used at the PoC UE to select desired media from the media stored in the PoC box for transmission to the PoC UE by checking a unique number of an element corresponding to a storage address of the desired media comprised in the media information at the PoC UE.

2. The method of claim 1, wherein the PoC session control data request message from the PoC UE is sent through an XML Configuration Access Protocol (XCAP).

3. The method of claim 1, wherein an address of media stored in the PoC box is stored in each element of an XML document, wherein each element has a unique number.

4. The method of claim 3, wherein the media stored in the PoC box is mapped to each element of the XML document.

5. The method of claim 3, further comprising the step of:
receiving at least one of a specific media transmission request and a specific media deletion request from a user using at least one of a binary address and a text-based address.

6. A method for managing Push-To-Talk (PTT) over Cellular (PoC) data in a PoC box in a PoC system comprising at least one PoC User Equipment (UE), a PoC server, an aggregation proxy server with a function for routing to an Extensible Markup Language (XML) Document Management Server (XDMS), and the PoC box, the method comprising the steps of:

receiving a session invite message sent from the at least one PoC UE through the PoC server;

generating and storing a PoC session control data on the basis of the received session invite message received from the at least one PoC UE;

receiving and storing a media sent from the at least one PoC UE through a connected session;

matching the media and the PoC session control data;

receiving a PoC session control data request message for requesting media information stored in the PoC box from the aggregation proxy server and sending the media information requested by the PoC session control data request message to the PoC UE through the aggregation proxy server, wherein the media information differs from the media stored in the PoC box; and receiving a Media Burst Control Protocol (MBCP) granted message from the PoC server for requesting desired media and sending the desired media requested by the MBCP granted message to the PoC UE through the PoC server, wherein the media information includes a stored position of the media stored in the PoC box and at least one of a media type, a provider PoC client, and a reception time, and the media information is used at the PoC UE to select the desired media from the media stored in the PoC box by checking a unique number of an element corresponding to a storage address of the desired media comprised in the media information at the PoC UE.

7. The method of claim 6, wherein the step of receiving the PoC session control data request message from the aggregation proxy server comprises:
determining an XML document corresponding to media information of requested media data on the basis of the PoC session control data request message and sending the XML document to the at least one PoC UE.

8. The method of claim 7, wherein the PoC session control data request message from the aggregation proxy server is sent using an XML Configuration Access Protocol (XCAP).

9. The method of claim 6, wherein the MBCP granted message comprises location information of a PoC data request message requested by the at least one PoC UE.

10. The method of claim 9, wherein the MBCP granted message comprises at least one of a PoC box field for identifying use of the PoC box, a PoC box length field for indicating a sum of bytes of PoC box-related fields, and an option value field comprising a value for indicating a unique number of an XML document element.

11. A method for managing Push-To-Talk (PTT) over Cellular (PoC) box media data in a PoC User Equipment (UE) in a PoC system comprising the PoC UE, a PoC sever, an aggregation proxy server with a function for routing to an Extensible Markup Language (XML) Document Management Server (XDMS), and a PoC box, the method comprising the steps of:

transmitting a PoC session control data request message for requesting media information stored in the PoC box to the PoC box through the aggregation proxy server;

receiving the media information in an XML form sent from the aggregation proxy server, wherein the media information differs from media stored in the PoC box, and the media information is used at the PoC UE to select desired media from the media stored in the PoC box;

checking a unique number of an element corresponding to a storage address of the desired media comprised in the media information;

generating a Media Burst Control Protocol (MBCP) request message for requesting the desired media corresponding to the unique number stored in the PoC box and sending the MBCP request message to the PoC server; and receiving the desired media corresponding to the unique number from the PoC box through the PoC server in response to the MBCP request message, wherein the media information includes a stored position of the media stored in the PoC box and at least one of a media type, a provider PoC client, and a reception time, and the media information is used at the PoC UE to select the desired media from the media stored in the PoC box for transmission to the PoC UE by checking the unique number of the element corresponding to a storage address of the desired media comprised in the media information at the PoC UE.

12. The method of claim 11, wherein the media information from the aggregation proxy server is sent using an XML Configuration Access Protocol (XCAP).

13. The method of claim 12, wherein the MBCP request message from the PoC UE to the PoC server is sent using an MBCP scheme.

14. The method of claim 12, wherein the MBCP request message comprises at least one of an option identifier (ID) field comprising a value for indicating a PoC box media transmission request message, an option length field for indicating a sum of bytes of option-related fields, and an option value field comprising a value for indicating a unique number of an XML document element.

* * * * *